United States Patent [19]

Miller et al.

[11] Patent Number: 5,518,090
[45] Date of Patent: May 21, 1996

[54] PISTON POST FOR A DAMPER

[75] Inventors: Lonnie G. D. Miller, Monroe, Mich.;
Graham B. Scott, Sylvania, Ohio

[73] Assignee: Monroe Auto Equipment Company, Monroe, Mich.

[21] Appl. No.: 522,220

[22] Filed: Aug. 31, 1995

Related U.S. Application Data

[63] Continuation of Ser. No. 215,360, Mar. 21, 1994, abandoned.

[51] Int. Cl.⁶ .............................. F16F 9/44; B60G 17/08
[52] U.S. Cl. ................ 188/322.15; 188/299; 188/282
[58] Field of Search ........................... 188/299, 322.15, 188/280, 282, 284, 281, 319

[56] References Cited

U.S. PATENT DOCUMENTS

| 2,765,446 | 8/1988 | Murata et al. | 188/322.15 |
|---|---|---|---|
| 5,078,240 | 1/1992 | Ackermann et al. | 188/322.15 |
| 5,207,300 | 5/1993 | Engle et al. | 188/322.15 |

FOREIGN PATENT DOCUMENTS

| 0047542 | 3/1984 | Japan | 188/322.15 |
|---|---|---|---|
| 0135935 | 5/1989 | Japan | 188/322.15 |
| 0159436 | 6/1990 | Japan | 188/322.15 |
| 0129137 | 6/1991 | Japan | 188/322.15 |

*Primary Examiner*—Matthew C. Graham
*Attorney, Agent, or Firm*—Harness, Dickey & Pierce

[57] ABSTRACT

A piston post (54) for use in a damper (10) comprising a pressure cylinder (48) having a working chamber (50) with first and second portions. The piston post (54) has a first flow passage (200) fluidly communicating with the first portion of the working chamber (50). In addition, the piston post (54) has a second flow passage (202) fluidly communicating with the second portion of the working chamber (50).

24 Claims, 6 Drawing Sheets

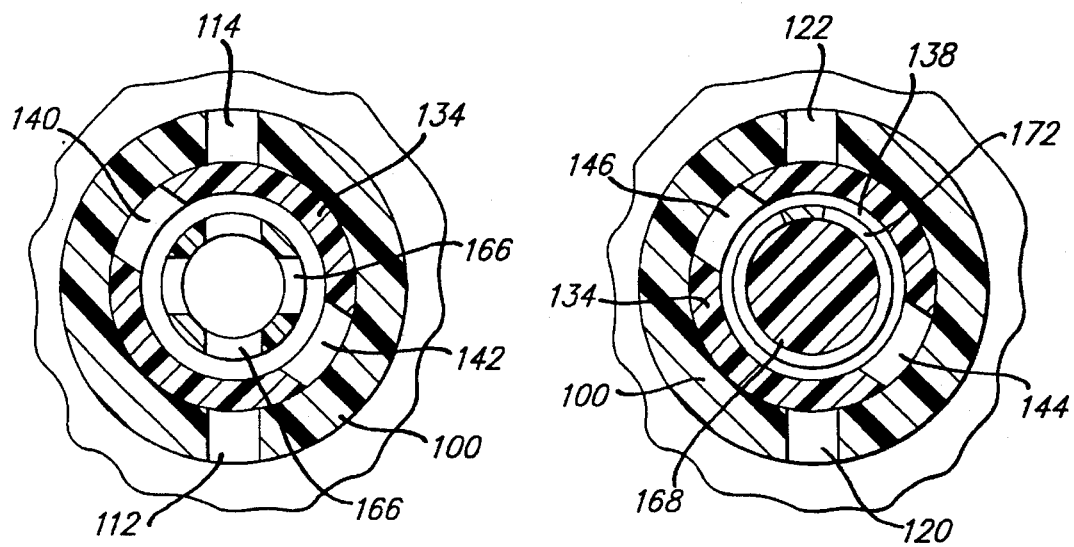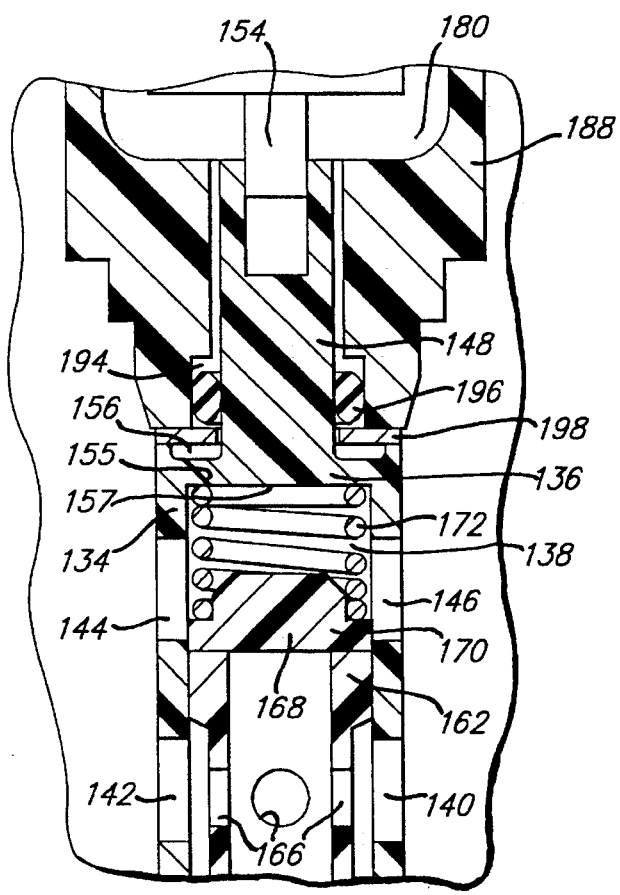

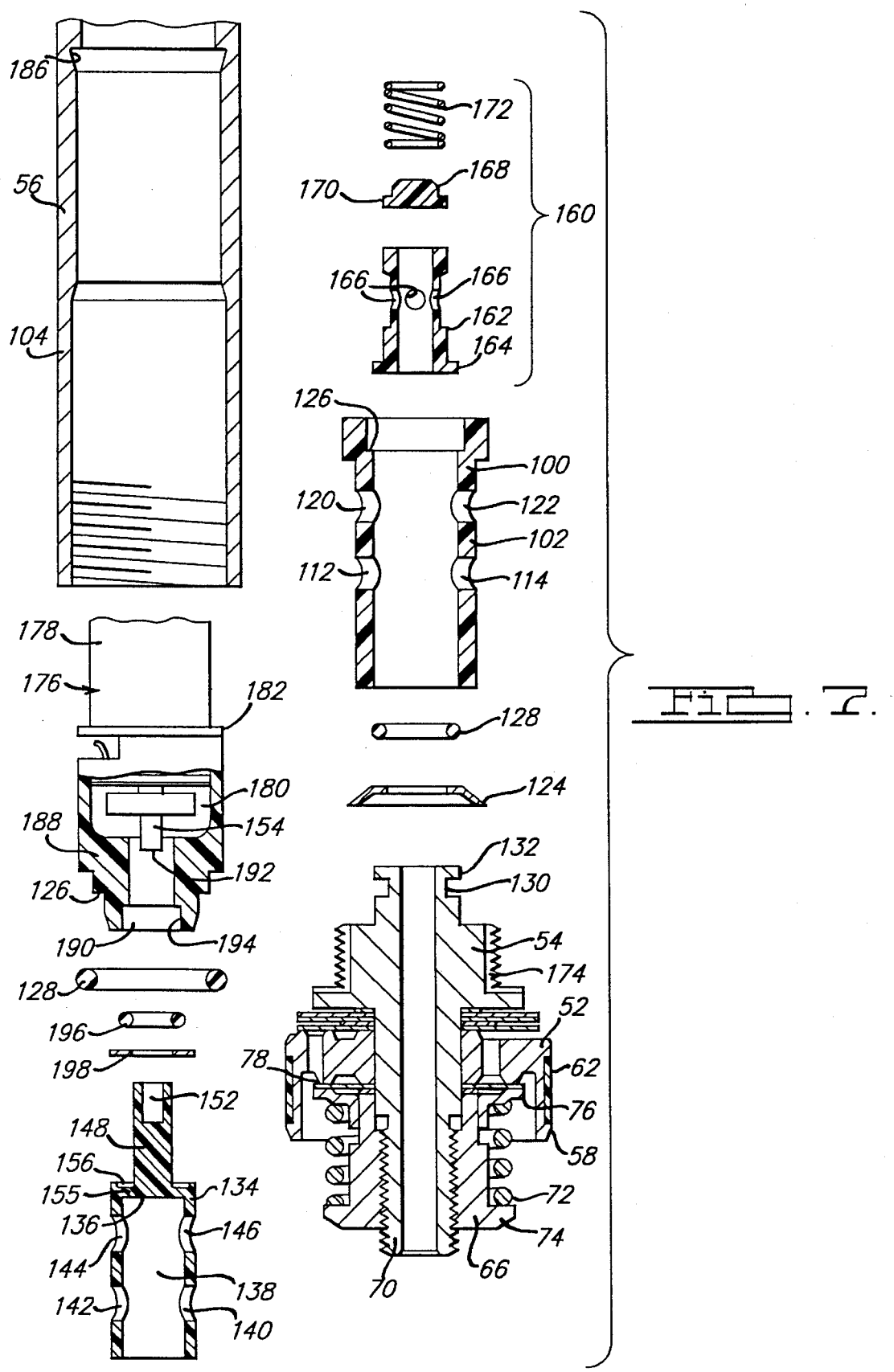

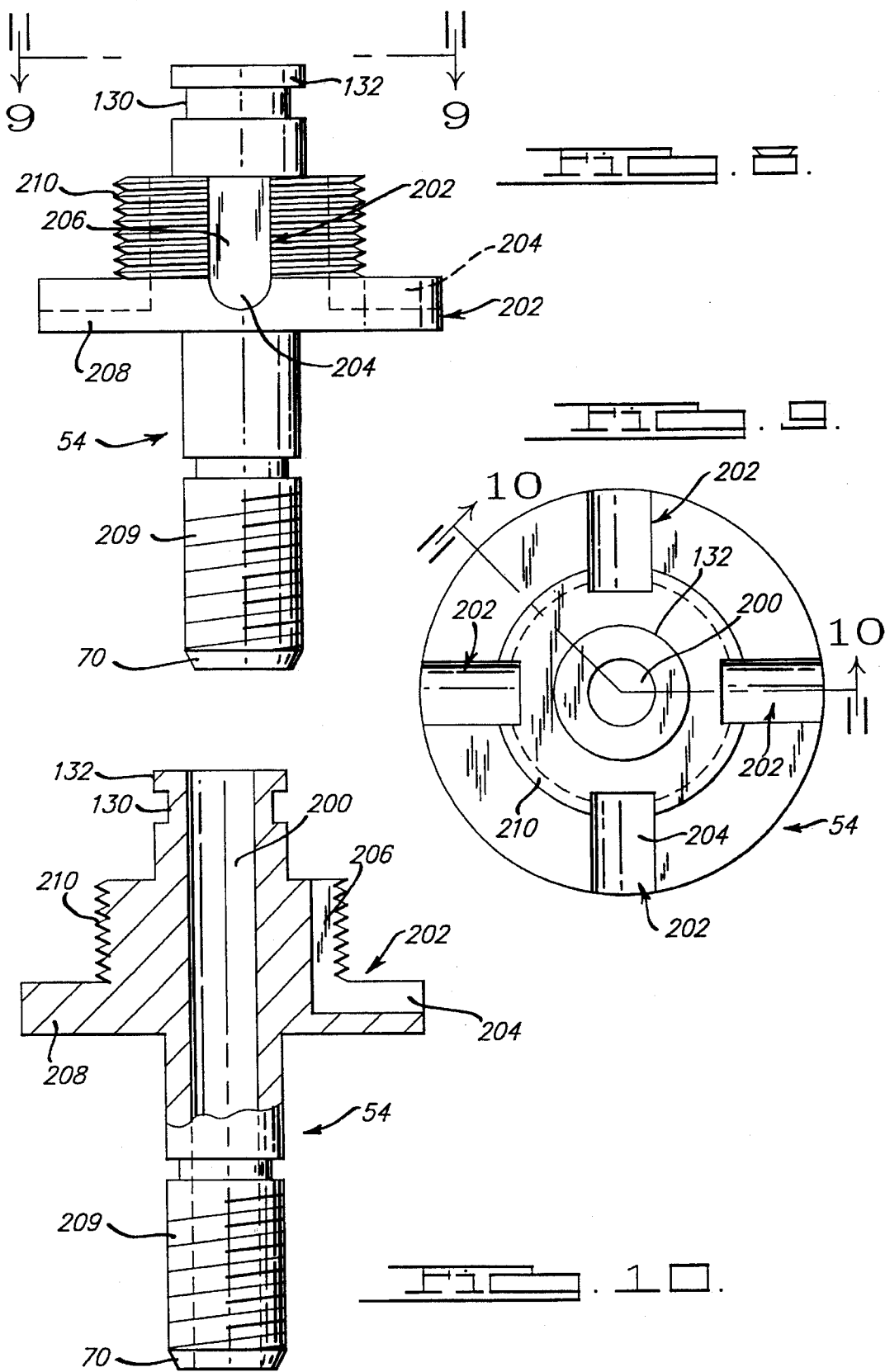

PISTON POST FOR A DAMPER

This is a continuation of U.S. patent application Ser. No. 08/215,360, filed Mar. 21, 1994, which has been expressly abandoned.

BACKGROUND OF THE INVENTION

1. Field of the Invention

This invention relates to suspension systems for automotive vehicles and machines which receive mechanical shock, and more particularly to a piston post for a damper.

2. Description of Related Art

Dampers are used in connection with automotive suspension systems to absorb unwanted vibrations which occur during driving. To dampen unwanted vibrations, dampers are generally connected between the body and the suspension of the automotive vehicle. A piston assembly is located within the damper and is connected to the body of the automotive vehicle through a piston post which in turn is connected to a piston rod. Because the piston assembly is able to limit the flow of damping fluid within the working chamber of the damper when the damper is compressed or extended, the damper is able to provide a damping force which "smooths" or "dampens" vibrations transmitted from the suspension to the body.

The greater the degree to which the flow of damping fluid within the working chamber is restricted by the piston assembly, the greater the damping forces which are provided by the damper. Accordingly, a "soft" compression and rebound stroke is produced when the flow of damping fluid in the working chamber is relatively unrestricted. In contrast, a "firm" compression and rebound stroke is produced when there is an increased restriction in the flow of damping fluid in the working chamber.

Because different driving characteristics depend on the amount of damping forces the damper provides, it is often desirable to have a damper in which the amount of damping forces generated by the damper is adjustable. One method for selectively changing the damping characteristics of a damper is disclosed in U.S. Pat. No. 4,890,858. This reference discloses a damping system in which a switch is used to control the damping characteristics of a suspension system. In this regard, the switch is used to control the position of a rotary valve inside each of the dampers in the suspension system. The rotary valve is in turn used to control the flow of damping fluid between the upper and lower portions of the working chamber so as to change damping characteristics.

While such dampers are effective in providing adjustable damping forces, they are sometimes susceptible to certain improvements. For example, the piston post is sometimes relatively long so as to accommodate the various components of the piston such as an annular spacer which is used to bias the valve disk associated with the piston. This is undesirable because the piston post adds to "dead length" of the damper since it remains within the pressure cylinder during operation of the damper. In addition, the piston rod sometimes has holes in its lower portion which are used to establish bypass passages around the piston. The formation of these bypass passages generally require several additional manufacturing operations which increase the cost of producing the piston rod. Further, the wall thickness of the piston rod has to be larger than is otherwise desired to accommodate the presence of the holes while still maintaining the desired strength of the piston rod.

SUMMARY OF THE INVENTION

Accordingly, it is the primary object of the present invention to provide a piston post for a damper in which the length of the piston post is reduced.

A further object of the present invention is to provide a piston post for a damper in which the "dead length" of the damper is reduced.

An additional object of the present invention is to reduce the number of components associated with a damper.

Another object of the present invention is to provide a piston post for a damper which permits the formation of the piston rod without requiring a machining operation to form holes in the piston rod. A related object of the present invention is to provide a piston post which has flow passages disposed therein which permit fluid communication between the upper and lower portions of the working chamber through a bypass valve.

A further advantage of the present invention is to provide means for securing a piston post to a damper which is relatively simple and low in cost.

A further object of the present invention is to provide an adjustable damper which is of relatively simple construction and relatively low in cost.

BRIEF DESCRIPTION OF THE DRAWINGS

Other objects of the present invention will become apparent to one skilled in the art upon reading the following specification and by reference to the following drawings in which:

FIG. 4 is a view taken in the direction of line 4—4 in FIG. 3;

FIG. 5 is a view taken in the direction of line 5—5 in FIG. 3;

FIG. 6 is a view of the upper portion of the rotary valve shown in FIG. 3;

FIG. 7 is an elevated perspective exploded view of the lower portion of the piston rod shown in FIG. 3 showing the actuator, rotary valve and piston;

FIG. 8 is an elevational view of the piston post shown in FIG. 3;

FIG. 9 is a top view of the piston post taken along the lines 9—9 in FIG. 8; and FIG. 10 is an elevational view, partially in cross-section, of the piston post taken along the lines 10—10 in FIG. 9.

DESCRIPTION OF THE PREFERRED EMBODIMENT

The following description of the preferred embodiment of the present invention is merely exemplary in nature and is in no way intended to limit the invention or its application or uses.

Figure 1:
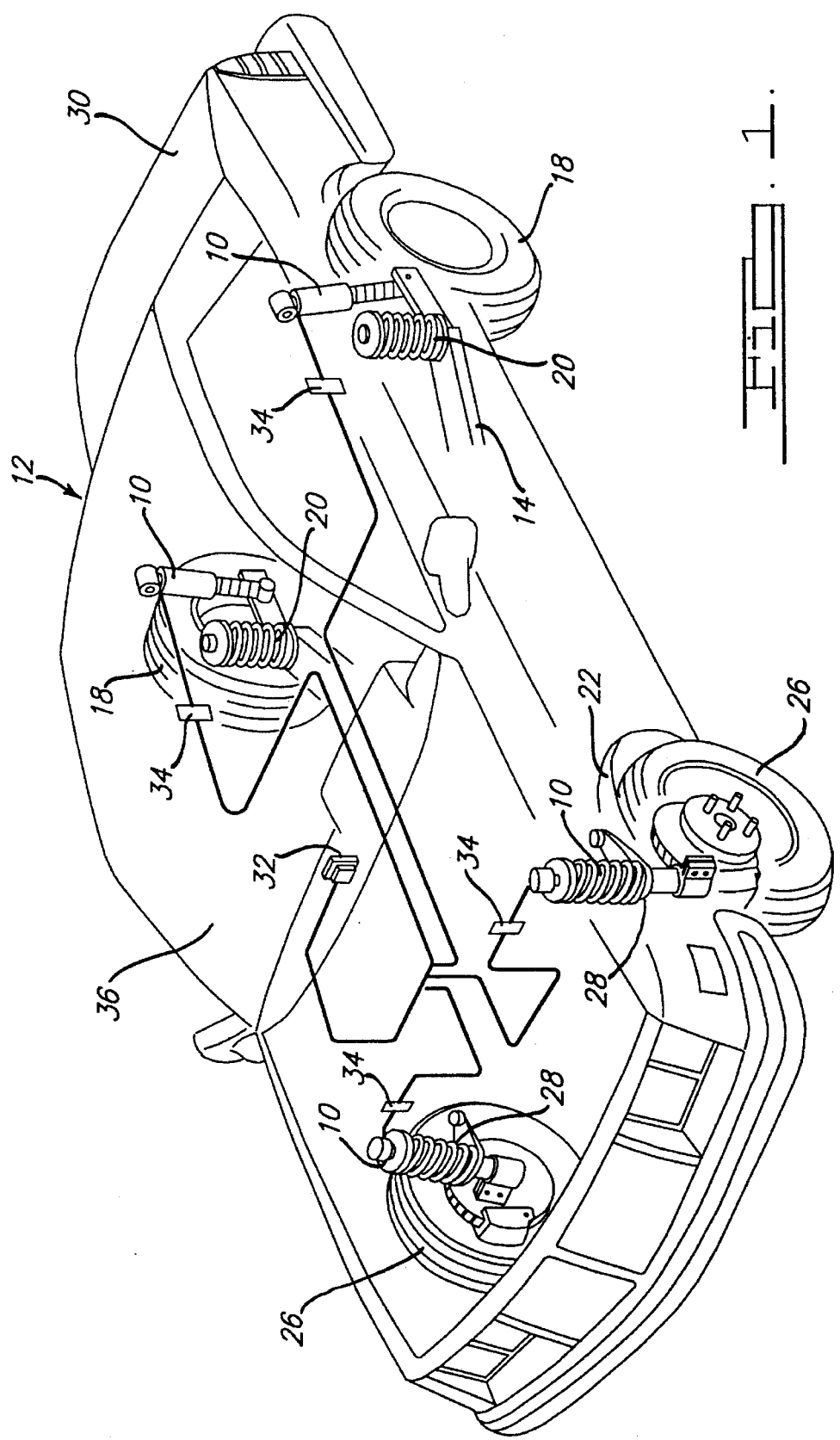
FIG. 1 is an illustration of an automotive vehicle using the adjustable damping system according to the teachings of the preferred embodiment of the present invention.

Referring to FIG. 1, a plurality of dampers 10 according to the preferred embodiment of the present invention are shown. The dampers 10 are depicted in operative association with a diagrammatic representation of a conventional automotive vehicle 12. The automotive vehicle 12 includes a rear suspension system 14 having a transversely extending drive axle assembly (not shown) adapted to operatively support the vehicle's rear wheels 18. The rear suspension system 14 is operatively connected to the automotive vehicle 12 by means of a plurality of dampers 10 as well as by a pair of coil springs 20. Similarly, the automotive vehicle 12 has a front suspension system 22 including a transversely extending front axle assembly (not shown) to operatively support the front wheels 26. Front axle assembly is operatively connected to the automotive vehicle 12 by means of a pair of dampers 10 and by a pair of coil springs 28. The dampers 10 serve to damp the relative movement of the unsprung portion (i.e., the front and rear suspension systems 22 and 14) and the sprung portion (i.e., the body 30) of the automotive vehicle 12.

While the automotive vehicle 12 has been depicted as a passenger car, the damper 10 may be used with other types of automotive vehicles which use other types of suspension systems. Further, the term "damper" as used herein will refer to dampers in the general sense of the phrase and will include MacPherson struts and shock absorbers.

To allow the damping characteristics of the dampers 10 to be controlled, a switch 32 and a plurality of electronic control modules 34 are provided. The switch 32 is located within the passenger compartment 36 of the automotive vehicle 12 and is accessible by the driver of the automotive vehicle 12. The switch 32 is used for selecting which type of damping characteristics the dampers 10 are to provide (i.e., firm or soft). The electronic control modules 34 receive the electronic control signals from the switch 32 and are used for controlling damping characteristics of the dampers 10. By controlling the damping characteristics of the dampers 10, the dampers 10 are able to dampen relative movement between the body 30 and the suspension of the automotive vehicle 12 in such a manner as to optimize both ride comfort and road handling ability simultaneously. It will be appreciated, however, that the present invention may be used with other types of suspension systems having dampers which are not controlled by a switch and/or a plurality of electronic control modules 34.

To secure the damper 10 to the automotive vehicle 12, the damper includes upper end fitting 38 and a lower end fitting 40. The upper end fitting 38 is connected to the upper cap portion 42 of the damper 10 by a weld. The upper end fitting 38 is in turn connected to the body 30 of the automotive vehicle 12. Similarly, the lower end fitting 40 is connected to the lower cap portion 44 of the damper 10 so as to secure the damper 10 to one of the suspension systems 14 and 22. As will be appreciated by those skilled in the art, other suitable means may be used to secure the damper 10 to the automotive vehicle 12.

The damper 10 comprises an elongated tubular pressure cylinder 48 defining a damping fluid-containing working chamber 50. Disposed within the chamber 50 is a reciprocal piston 52. The reciprocal piston 52 is used to restrict the flow of damping fluid between the upper and lower portions of the working chamber so as to generate damping forces. To provide means for securing the reciprocal piston 52 within the pressure cylinder 48, an axially extending piston post 54 is provided. As shown in FIG. 7, the reciprocal piston 52 is secured to one end of the axially extending piston post 54 which is in turn secured to an axially extending piston rod 56. The construction and operation of the piston post 56 will be more fully discussed below. The piston 52 comprises a housing 58 having a plurality of ridges (not shown) disposed on the annular exterior of the piston housing 58. The piston 52 comprises a housing 58 having a plurality of ridges (not shown) disposed on the annular exterior of the piston housing 58. The ridges are used to secure an annular TEFLON sleeve 62 which is disposed between the ridges of the piston housing 58 and the pressure cylinder 48. The TEFLON sleeve 62 permits movement of the piston 52 with respect to the pressure cylinder 48 without generating undue frictional forces.

Upward movement of the piston 52 is limited by a radially extending step portion 68 of the piston post 54. Downward movement of the piston 52 is limited by a threaded nut 66 or similar type fastening element which is threadably received upon the lower portion 70 of the piston post 54. A helical coil spring 72 is arranged concentrically of the nut 66 and is supported at the lower end thereof by a radially outwardly extending flange 74 on the lower end of the nut 66. The upper end of the spring 72 bears against a spring retainer 76 which in turn acts against the underside of a valve disk 78 to thereby resiliently urge the valve disk 78 into sealing engagement with the piston housing 58. A further explanation of the construction and operation of the piston is disclosed in U.S. Pat. No. 4,113,072, which is hereby incorporated by reference. However, other suitable piston designs may also be used.

A base valve, generally designated by the numeral 80, is located within the lower end of the pressure cylinder 48 and is used to control the flow of damping fluid between the working chamber 50 and an annular fluid reservoir 82. The annular fluid reservoir 82 is defined as the space between the outer periphery of the pressure cylinder 48 and the inner periphery of the housing 46. The operation of the base valve 80 may be similar to the operation of the base valve shown in U.S. Pat. No. 3,757,910, which is hereby incorporated by reference. However, other types of base valves may be used.

The damper 10 further includes a connector (not shown) which is disposed within the upper cap portion 42 of the damper 10. The connector is used to provide electrical communication between the flex cable 90 which is connected to the actuator described below and the cables 92 leading to the electronic control module 34 associated with the damper 10. While the connector 88 may be that which is available from Pave Technology, other suitable connectors may be used.

To provide means for regulating the flow of damping fluid between the upper and lower portions of the working chamber 50, a rotary valve 98 is provided. The rotary valve 98 controls the flow of damping fluid between the upper and lower end portions of the working chamber 50 which bypasses the piston 52. Accordingly, when a firm compression and rebound stroke is desired, the rotary valve 98 may be closed so as to permit damping fluid to flow only through the piston 52. When a soft compression and rebound stroke is desired, the rotary valve 98 is opened so that the amount of damping fluid flowing between the upper and lower portions of the working chamber 50 may be increased. The amount of damping fluid flowing through the rotary valve 98 is adjusted by an actuator described below which in turn is electrically controlled by the electronic control module 34.

The rotary valve 98 comprises an annular orifice sleeve 100 which is coaxially disposed within the piston rod 56. The lower end portion of the orifice sleeve 100 has a reduced diameter section 102 which mates with an increased internal diameter section 104 of the piston rod 56 so as to form a cavity 106 therebetween. Fluid from the upper portion of the working chamber 50 is able to flow into and out of the cavity 106 by means of a plurality of four flow passages 174 which are located on the periphery of the upper portion of the piston post 54. To support the orifice sleeve 100 in an upward direction, a disk-shaped spring 124 is provided. The spring 124 is disposed between the lower portion of the orifice sleeve 100 and the upper portion of the piston post 54 so as to bias the orifice sleeve 100 in an upward direction. The orifice sleeve 100 also has a step 126 which engages the sensor housing of the actuator described below so as to limit upward movement of the orifice sleeve 100. Damping fluid is prevented from flowing between the orifice sleeve 100 and the piston post 54 by an annular retaining seal 128. The annular retaining seal 128 is disposed within an annular groove 130 in an axially extended portion 132 of the piston post 54.

The orifice sleeve 100 has a plurality of flow passages 112–114 and 120–122. The centers of the flow passages 112 and 114 are disposed on a plane which is perpendicular to the axis of the orifice sleeve 100. Further, the flow passages 120 and 122 are axially displaced from the flow passages 112 and 114 and are disposed on a plate which is perpendicular to the axis of the orifice sleeve 100. The flow passages 112 and 114 are substantially identical and are spaced 180° apart. Similarly, the flow passages 120 and 122 are also substantially identical and are spaced 180° apart. In addition, the flow passages 120 and 122 have a diameter which is preferably the same as or larger than the diameter of the flow passages 112 and 114. Because of their relatively large diameter, a soft rebound and compression stroke is generated by the damper 10 when damping fluid is flowing through the flow passages 112, 114, 120 and 122. When damping fluid is not flowing through any of the flow passages 112–114 and 120–122 in the orifice sleeve 100, a firm compression and rebound stroke is generated since the flow of damping fluid is regulated only by the piston 52.

To control the flow of damping fluid flowing through the flow passages 112–114 in the orifice sleeve 100, the rotary valve 98 further comprises an annular shutter sleeve 134 with a closed upper end portion 136 and a central bore 138. The shutter sleeve 134 is disposed coaxially within the orifice sleeve 100, with the radially outer surface of the shutter sleeve 134 being adjacent to the radially inner surface of the orifice sleeve 100. The shutter sleeve 134 has a plurality of flow passages 140–146. The flow passages 140 and 142 are disposed symmetrically about a plane passing axially through the center of the shutter sleeve 134, while the flow passages 144 and 146 are disposed symmetrically about a plane passing axially through the center of the shutter sleeve 134. The centers of the flow passages 140 and 142 lie within the plane established by the centers of the flow passages 112 and 114 in the orifice sleeve 100. Similarly, the center of the flow passages 144 and 146 lies within the plane established by the centers of the flow passages 120 and 122 in the orifice sleeve 100. As will be more thoroughly discussed below, rotation of the shutter sleeve 134 controls the flow of damping fluid through the flow passages 140–146 of the shutter sleeve 134 and the flow passages 112–114 and 120–122 in the orifice sleeve 100.

When the shutter sleeve 134 is rotated such that the flow passages 140–146 in the shutter sleeve 134 are aligned with the flow passages 112,114, 120 and 122 in the orifice sleeve 100, damping fluid is able to flow between the upper and lower portions of the working chamber 50 through the flow passages 140–146 and the flow passages 112,114,120 and 122. Because the flow passages 112, 114, 120 and 122 in the orifice sleeve 100 are relatively large, a soft compression and rebound stroke is generated. When the shutter sleeve is rotated further such that the flow passages 140–146 in the shutter sleeve 134 are not aligned with any of the flow passages 112–114 and 120–122 in the orifice sleeve 100, damping fluid is unable to flow through the rotary valve 98. Accordingly, the flow of damping fluid between the upper and lower portions of the working chamber 50 is governed by the piston 52 which provides a firm damping characteristic as discussed above. It will be noted that the flow passages 120 and 122 in the orifice sleeve 100 and the flow passages 144 and 146 in the shutter sleeve 134 are used in conjunction with a check valve described below.

The shutter sleeve 134 further comprises an axially extending projection 148 disposed on the closed upper end portion 136 of the shutter sleeve 134 having a downwardly extending slot 152. The projection 148 extends in the direction towards the upper portion of the working chamber 50 and is used to engage the shaft 154 of the actuator described below which is used to rotate the shutter sleeve 134. By rotating the shutter sleeve 134, the flow passages 140–146 in the shutter sleeve 134 are able to selectively mate with the flow passages 112–114 and 120–122 in the orifice sleeve 100 so that the flow of damping fluid between the upper and lower portions of the working chamber 50 can be controlled.

To provide means for generating a soft compression stroke relative to the rebound stroke, a check valve 160 is provided. The check valve 160 comprises an annular check valve sleeve 162 which is located coaxially within the central bore 138 of the shutter sleeve 134. The lower portion of the check valve sleeve 162 has a radially extending flange 164 which abuts the upper portion of the piston post 54. The check valve sleeve 162 extends from the piston post 54 in a direction towards the upper portion of the working chamber to a point just below the flow passages 144–146 in the shutter sleeve 134. The check valve sleeve 162 has a plurality of radially extending flow passages 166, the centers of which occupy a plane which is coplanar with the plane established by the centers of the flow passages 120–122 in the orifice sleeve 100. Accordingly, damping fluid is able to flow between the upper and lower portions of the working chamber 50 through the flow passages 166 in the check valve sleeve 162 and the flow passages 120–122 in the orifice sleeve 100 when the flow passages 144–146 in the shutter sleeve 134 are aligned with the flow passages 120–122 in the orifice sleeve 100.

The check valve 160 further comprises a closure member 168 which is located within the central bore 138 of the shutter sleeve 134 and is disposed coaxially with respect to the check valve sleeve 162 at the upper end portion thereof. The closure member 168 has a radially extending flange 170 which is able to mate with the upper end portion of the check valve sleeve 162. When the closure member 168 is mated to the upper end portion of the check valve sleeve 162, damping fluid is unable to flow between the upper and lower portions of the working chamber 50 through the flow passages 120–122 of the orifice sleeve 100 as well as the flow passages 144 and 146 of the shutter sleeve 108. However, when the closure member 168 is displaced from the upper surface of the check valve sleeve 162, damping fluid is able to flow between the upper and lower portions of the working chamber 50 through the check valve 160 by way of the flow passages 120–122 of the orifice sleeve 100, and the flow passages 144 and 146 of the shutter sleeve 134.

To bias the closure member 168 against the upper end portion of the check valve sleeve 162, a spring 172 is provided. The spring 172 is disposed within the central bore 138 of the shutter sleeve 134 between the closed upper end portion 136 of the shutter sleeve 134 and the flange 170 of the closure member 168. When the pressure in the lower portion of the working chamber 50 exceeds the pressure in the upper portion of the working chamber 50 so as to overcome the force exerted on the closure member 168 by the spring 172, the damping fluid in the lower portion of the working chamber 50 causes the closure member 168 to compress the spring 172. As the spring 172 is compressed, damping fluid within the check valve sleeve 162 is able to flow from the check valve sleeve 162 through the flow passages 144 and 146 in the shutter sleeve 134 and the flow passages 120–122 in the orifice sleeve 100 into the cavity 106 when the flow passages 120–122 are aligned with the flow passages 144 and 146. The damping fluid in the cavity 106 is then able to flow to the upper portion of the working chamber 50 through the flow passages 174 in the piston post 54 so as to produce a relatively soft compression stroke. During rebound, the spring 172 causes the closure member 168 to be displaced towards the upper end portion of the check valve sleeve 162 so as to prevent damping fluid in the upper portion of the working chamber 50 to flow to the lower portion of the working chamber 50 through the flow passages 120–122 in orifice sleeve 100 and the flow passages 144–146 in the shutter sleeve 134. Accordingly, a relatively firm rebound stroke is produced by the check valve 160.

From the discussion above, it will be seen that the forces acting on the shutter sleeve 134 are balanced. For example, forces exerted on the shutter sleeve 134 by the damping fluid flowing through the flow passages 112 and 120 are balanced by the flow of damping fluid flowing through the flow passages 114 and 122. Further, the force exerted on the closed upper end portion 136 of the shutter sleeve 134 by the damping fluid in the central bore 138 is balanced by the force exerted by the pressure of the damping fluid within the annular recess 156 which is received from the central bore 138 through the flow passage 155. In addition, the shutter sleeve 134 and the check valve sleeve 162 are rotationally independent so that the forces acting on the check valve 160 are not transmitted to the shutter sleeve 134. Because the forces acting on the shutter sleeve 134 are balanced, the actuator described below is able to rotate the shutter sleeve 134 without encountering excessive frictional forces. Because the actuator is therefore able to rotate the shutter sleeve at a greater angular velocity, the actuation time of the rotary valve 98 is decreased. Further, the expected longevity of the rotary valve 98 as well as the actuator are increased as less mechanical stress acts upon the rotary valve 98 and the actuator 176.

To drive the rotary valve 98, an actuator 176 is provided which is coaxially disposed within the piston rod 56. The actuator 176 is used for rotating the shutter sleeve 134 so that the rotary valve 98 may control the flow of damping fluid between the upper and lower portions of the working chamber 50. The actuator 176 has a motor/gear portion 178 and a sensor portion 180 which are separated by a circular support plate 182 which is secured to the motor/gear portion 178 by a plurality of screws (not shown). The circular support plate 182 abuts a step 186 in the piston rod 56 so as to prevent upward movement of the actuator 176. In addition, the sensor portion 180 comprises a sensor housing 188 that abuts the step 126 in the orifice sleeve 100 to prevent downward movement of the actuator 176. The sensor housing 188 has an aperture 190 which is used to receive the projection 148 of the shutter sleeve 134 as well as a shaft 154 from the actuator 176. The shaft 154 of the actuator 176 has a rectangular end portion 192 which is able to be received by the slot 152 in the projection 148. Accordingly, rotation of the shaft 154 causes rotation of the projection 148 and hence the shutter sleeve 134.

The sensor housing 188 further has a recess 194 at its lower end portion which is able to receive an annular retaining seal 196. The annular retaining seal 196 is disposed within the recess 194 to prevent damping fluid to flow between the sensor housing 188 and the projection 148 of the shutter sleeve 134. Further, an annular retaining seal 197 is located adjacent to the interior surface of the piston rod 56 between the sensor housing 188 and the orifice sleeve 100 so as to prevent damping fluid from flowing therebetween. An annular disk 198 is disposed between the sensor housing 188 and the upper closed end portion 136 of the shutter sleeve 134 so as to limit upward movement of the shutter sleeve 134. While the actuator 176 may be manufactured by Copal Co., Ltd., other suitable actuators may be used.

To allow the orifice sleeve 100 and the shutter sleeve 134 to receive damping fluid from the lower portion of the working chamber 50, the piston post 54 includes a first flow passage 200 as shown in FIG. 10. The first flow passage 200 extends from the lower portion 70 of the piston post 54 to the axially extended upper end portion 132 of the piston post 54. In addition, the axial centerline of the first flow passage 200 is coaxial with the axial centerline of the piston post 54. Because the lower portion 70 of the piston post 54 fluidly communicates with the lower portion of the working chamber 50, the first flow passage 200 is able to deliver fluid from the lower portion of the working chamber 50 to the orifice sleeve 100 as well as the shutter sleeve 134.

To allow the orifice sleeve 100 and the shutter sleeve 134 to receive damping fluid from the upper portion of the working chamber 50, the piston post 54 further comprises a plurality of second flow passages 202. Each of the second flow passages 202 has a radially extending portion 204 as well as an axially extending portion 206. The radially extending portions 204 of each of the second flow passages 202 is disposed on the upper surface of a circular flange member 208 which is disposed between the axially extended upper end portion 132 of the piston post 54 and the lower portion 70 of the piston post 54. The circular flange member 208 is also used to provide support to the valve disks 78 which are used to control the flow of damping fluid through the piston 52. At its minimum, the cross-sectional area of each of the second flow passages 202 is such that the combined cross-sectional area of all of the second flow passages 202 is greater than the cross-sectional area of the first flow passage 200.

The axially extending portions 206 of each of the second flow passages 202 are disposed on the radially outer surface of a threaded portion 209 of the piston post 54. The threaded portion 209 of the piston post 54 is disposed between the circular flange portion 208 and the axially extended upper end portion 132 of the piston post 54. The threaded portion 209 engages an internally threaded lower portion of the piston rod 56 so as to secure the piston post 54 to the piston rod 56. Because the radially extended portions 204 of the second flow passages 202 fluidly communicate with the upper portion of the working chamber 50, damping fluid is able to flow between the upper portion of the working chamber 50 and the orifice sleeve 100 as well as the shutter sleeve 134 through the radially extending portions 204 and the axially extending portions 206 of the second flow passage 202 as well as through the cavity 106.

Figure 2:
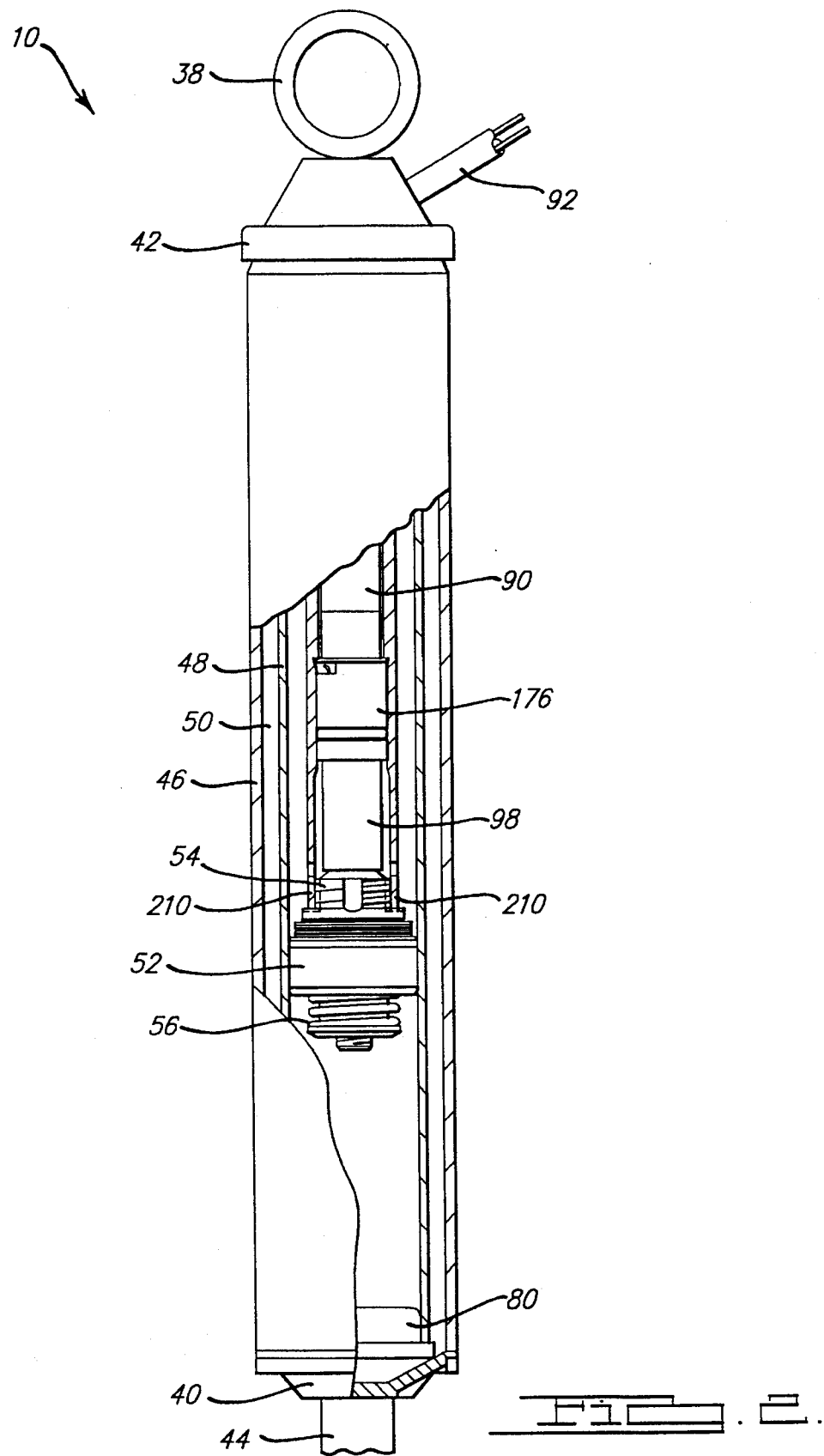
FIG. 2 is the schematic representation of the damper using the adjustable damping system according to the teachings of the preferred embodiment of the present invention.
Figure 3:
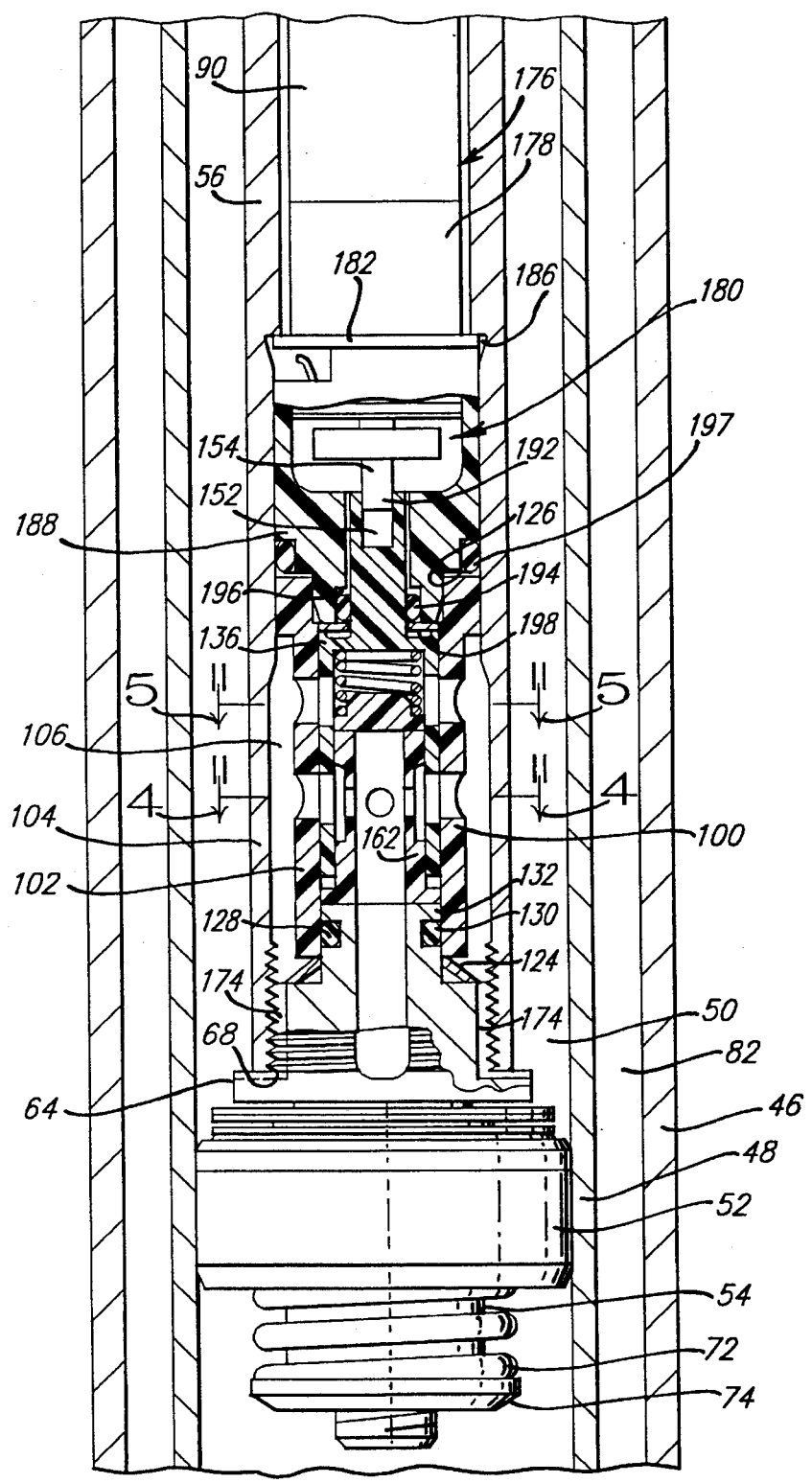
FIG. 3 is a side elevational view, partially broken away, of the lower portion of the damper shown in FIG. 2.

The piston post 54 may be secured to the piston rod 56 by deforming the piston rod 56 in two regions 210 (see FIG. 2)

adjacent to two of the axially extending portions 206 thereby causing the deformed regions 210 of the piston rod 56 to project into two of the axially extending portions 206. By deforming the piston rod 56 in this manner, mechanical interference is created between the piston post 54 and the piston rod 56 so as to prevent rotation of the piston post 54 with respect to the piston rod 56. When such deformation of the piston rod 56 occurs, the deformed regions 210 of the piston rod 56 close off approximately 70% of the cross-section of the axially extending portions 206 which receive the deformed regions 210. It will be appreciated that the use of the deformed regions 210 on the piston rod 56 prevent the need for use of adhesives which may contaminate or otherwise cause the piston post 54 to loosen during operation.

The flow of damping fluid through the various components of the damper will now be described. When the shutter sleeve 134 is rotated such that the flow passages 140–146 in the shutter sleeve 134 are aligned with the flow passages 112, 114, 120 and 122 in the orifice sleeve 100, damping fluid is able to flow between the upper and lower portions of the working chamber 50 in the following manner: through the radial portions 204 of the flow passages 202 and then the axially extending portions 206 and the flow passages 202, the flow passages 140–146 in the shutter sleeve 134 and the flow passages 112, 114, 120 and 122 in the orifice sleeve 100 and the flow passage 200 in the piston post 54. Because the flow passages 112, 114, 120 and 122 in the orifice sleeve 100 are relatively large, a soft compression and rebound stroke is generated.

When the shutter sleeve is rotated further such that the flow passages 140–146 in the shutter sleeve 134 are not aligned with any of the flow passages 112–114 and 120–122 in the orifice sleeve 100, damping fluid is unable to flow through the rotary valve 98. Accordingly, the flow of damping fluid between the upper and lower portions of the working chamber 50 is governed by the piston 52 which provides a firm damping characteristic as discussed above. It will be noted that the flow passages 120 and 122 in the orifice sleeve 100 and the flow passages 144 and 146 in the shutter sleeve 134 are used in conjunction with a check valve 160 described above.

Because the piston post 54 includes the second flow passages 202, damping fluid is able to flow between the cavity 106 and the upper portion of the working chamber 50 without the need of holes in the piston rod 56. Accordingly, the machining steps required to form the piston rod 56 may be reduced and the thickness of the cylindrical walls of the piston rod 56 may also be reduced. Further, since the circular flange member 208 is used to place a biasing force on the valve disks 78, the need for an annular spacer between the piston 52 and the piston post 54 is eliminated so that the "dead length" (i.e., the portion of the piston rod 56 and piston post 54 which does not move out of the pressure cylinder) is reduced.

While it will be appreciated that the preferred embodiment illustrated herein is well calculated to fill the objects stated above, it will be appreciated that the invention is susceptible to modifications, variations and changes without departing from the scope of the invention. For example, the shape of the piston post may change as well as the shape of the flow passages in the piston post. In addition, the number of flow passages disposed within the piston post may vary. Accordingly, the scope of the invention is therefore to be measured against the scope of the following claims.

What is claimed is:

1. A damper comprising:
   a pressure cylinder forming a working chamber having first and second portions operable to store damping fluid;
   a piston rod at least partially disposed within said pressure cylinder;
   a piston disposed within said pressure cylinder;
   a piston post securing said piston to said piston rod, said piston post including
   (a) a first flow passage fluidly communicating with said first portion of said working chamber,
   (b) a second flow passage fluidly communicating with said second portion of said working chamber,
   means for securing said piston post to said piston rod, and
   (d) a flange radially extending from said piston post, wherein said first flow passage is formed radially along a radial surface of said flange and axially along said means for securing said piston post to said piston rod.

2. The damper according to claim 1, wherein said flange is disposed between said piston rod and a means for restricting the flow of damping fluid through said piston.

3. The damper according to claim 1, wherein said piston rod and said piston post are operable to define a cavity, said first flow passage fluidly communicating with said first portion of said working chamber and said cavity.

4. The damper according to claim 1, further comprising a valve member disposed within a cavity formed by said piston rod and said piston post, said first flow passage allowing damping fluid to flow between said first portion of said working chamber and said valve member, said second flow passage allowing damping fluid to flow between said second portion of said working chamber and said valve member.

5. The damper according to claim 1, wherein said second flow passage extends axially the length of said piston post.

6. The damper according to claim 1, further comprising means for restricting the flow of damping fluid through said piston, said flange being operable to bias said means for restricting against said piston.

7. The damper according to claim 1, wherein said piston rod further includes a deformed region being operable to engage said means for securing said piston post to said piston rod, said deformed region being operable to secure said piston rod to said piston post.

8. A damper comprising:
   a pressure cylinder forming a working chamber having first and second portions operable to store damping fluid;
   a piston rod at least partially disposed within said pressure cylinder, said piston rod having at least one deformed region disposed thereon;
   a piston disposed within said pressure cylinder, damping fluid being able to flow between said first and second portions of said working chamber through said piston; and
   a piston post operable to secure said piston to said piston rod, said piston post being further operable to be engaged by said deformed region of said piston rod so as to create a mechanical interference between said piston post and said piston rod to secure said piston post to said piston rod, said piston post forming a radially extending flange which partially defines a flow passage along a radial surface of said flange and axially along a means for securing said piston post to said piston rod.

9. The damper of claim 8, wherein said piston post includes a plurality of flow passages operable to allow fluid communication between the upper and lower portions of said working chamber, said deformed region engaging at least one of said flow passages.

10. A damper comprising:

a pressure cylinder forming a working chamber having first and second portions operable to store damping fluid;

a piston rod at least partially disposed within said pressure cylinder;

a piston disposed within said pressure cylinder, damping fluid being able to flow between said first and second portions of said working chamber through said piston;

means for restricting the flow of damping fluid through said piston; and a piston post operable to secure said piston to said piston rod, said piston post having a radially extending flange operable to bias said means for restricting the flow of damping fluid against said piston, said radially extending flange partially defining a first flow passage formed radially along a first radial surface of said flange and axially along a means for securing said piston post to said piston rod.

11. The damper according to claim 10, wherein said flange is disposed adjacent to said means for restricting the flow of damping fluid.

12. The damper according to claim 11, wherein said means for restricting the flow of damping fluid comprises at least one valve disk, said flange being disposed adjacent to said valve disk.

13. The damper according to claim 12, wherein said piston post has said first flow passage and a second flow passage disposed therein.

14. The damper according to claim 13, wherein said flange has said first radial surface and a second radial surface, said first surface being disposed adjacent to said piston rod, and said second surface being disposed adjacent to said valve disk.

15. A damper comprising:

a pressure cylinder forming a working chamber having first and second portions operable to store damping fluid;

a piston rod including a cylindrical wall partially disposed within said pressure cylinder, damping fluid being unable to flow through said cylindrical wall of said piston rod;

a piston disposed within said pressure cylinder being operable to restrict the flow of damping between the first and second portions of said working chamber;

a piston post operable to secure said piston to said piston rod, said piston post having a radially extending flange having a first flow passage formed radially along a radial surface of said flange and axially along a means for securing said piston post to said piston rod; and a rotary valve disposed within said pressure cylinder operable to partially control the flow of damping fluid between the first and second portions of said working chamber.

16. The damper according to claim 15, wherein said piston post includes:

(a) said first flow passage fluidly communicating with said first portion of said working chamber, and (b) a second flow passage fluidly communicating with said second portion of said working chamber.

17. The damper according to claim 16, wherein said piston rod and said piston post are operable to define a cavity, said first flow passage fluidly commuicating with said first portion of said working chamber and said cavity.

18. The damper according to claim 17, wherein said rotary valve is disposed within said cavity, said first flow passage allowing damping fluid to flow between said first portion of said working chamber and said rotary valve, said second flow passage allowing damping fluid to flow between said second portion of said working chamber and said rotary valve.

19. The damper according to claim 18, wherein said second flow passage extends axially the length of said piston post.

20. The damper according to claim 18, further comprising means for restricting the flow of damping fluid through said piston, said piston post being operable to bias said means for restricting the flow of damping fluid against said piston.

21. A method for controlling the flow of damping fluid between first and second portions of the working chamber of a damper, said damper having a pressure cylinder with a piston and a piston rod disposed therein, said piston being secured to said piston rod by a piston post, said method comprising the steps of:

allowing a valve disposed within said piston rod to fluidly communicate with damping fluid in said first portion of said working chamber through a first flow passage formed in a flange radially extending from said piston post, said first flow passage formed radially along a radial surface of said flange and axially along a means for securing said piston post to said rod;

allowing damping fluid in said second portion of said working chamber to fluidly communicate with said valve through a second flow passage in said piston post;

controlling the operation of said valve to vary the damping forces generated by said damper.

22. The method of claim 21, wherein said damper further comprises at least one valve disk disposed adjacent to said piston, said method comprising the additional step of limiting the movement of said valve disk by said piston post.

23. The method of claim 21, wherein said step of allowing a valve disposed within said piston rod to fluidly communicate with damping fluid in said first portion of said working chamber includes the step of limiting the flow of damping fluid through said piston rod.

24. The method of claim 21, comprising the additional step of deforming said piston rod in a region adjacent to said piston post thereby securing said piston post to said piston rod.

* * * * *